United States Patent
Sullivan

(10) Patent No.: US 10,645,061 B2
(45) Date of Patent: *May 5, 2020

(54) METHODS AND SYSTEMS FOR IDENTIFICATION OF A DOMAIN OF A COMMAND AND CONTROL SERVER OF A BOTNET

(71) Applicant: CLOUDFLARE, INC., San Francisco, CA (US)

(72) Inventor: Nicholas Thomas Sullivan, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/122,129

(22) Filed: Sep. 5, 2018

(65) Prior Publication Data

US 2019/0020623 A1    Jan. 17, 2019

Related U.S. Application Data

(63) Continuation of application No. 14/978,209, filed on Dec. 22, 2015, now Pat. No. 10,097,511.

(51) Int. Cl.
*H04L 29/12* (2006.01)
*H04L 29/08* (2006.01)

(52) U.S. Cl.
CPC ...... *H04L 61/3025* (2013.01); *H04L 61/1511* (2013.01); *H04L 67/28* (2013.01); *H04L 61/6013* (2013.01)

(58) Field of Classification Search
CPC .......... H04L 61/3025; H04L 61/1511
See application file for complete search history.

(56) References Cited

U.S. PATENT DOCUMENTS

| | | | |
|---|---|---|---|
| 8,260,914 | B1 | 9/2012 | Ranjan |
| 9,160,702 | B2 | 10/2015 | Dempsky et al. |
| 9,185,127 | B2 | 11/2015 | Neou et al. |
| 9,245,121 | B1 | 1/2016 | Luo et al. |
| 9,405,903 | B1 | 8/2016 | Xie et al. |
| 9,560,072 | B1 * | 1/2017 | Xu .................... H04L 63/1416 |
| 2008/0028463 | A1 | 1/2008 | Dagon et al. |
| 2008/0155694 | A1 | 6/2008 | Kwon et al. |

(Continued)

OTHER PUBLICATIONS

Dagon, et al., "From Throw-Away Traffic to Bots: Detecting the Rise of DGA-Based Malware", 2012, 16 pages.

(Continued)

*Primary Examiner* — Shirley X Zhang
(74) *Attorney, Agent, or Firm* — Nicholson De Vos Webster & Elliott LLP

(57) ABSTRACT

Methods and apparatuses for identifying a domain of a command and control server of a botnet are described. Upon receipt of a request to register a domain for a service that includes a proxy server, where the proxy server is to receive and process traffic for that domain if registration is successful, a determination of whether the domain was generated by a domain generation algorithm (DGA) is performed. Responsive to determining that the domain was generated by the DGA, accepting registration of the domain for the service and causing the proxy server to monitor communications received to and from the domain.

15 Claims, 7 Drawing Sheets

(56) References Cited

U.S. PATENT DOCUMENTS

| | | | |
|---|---|---|---|
| 2010/0106794 A1 | 4/2010 | Parsons et al. | |
| 2012/0023090 A1 | 1/2012 | Holloway et al. | |
| 2012/0084860 A1 | 4/2012 | Cao et al. | |
| 2012/0117239 A1 | 5/2012 | Holloway et al. | |
| 2012/0324113 A1 | 12/2012 | Prince et al. | |
| 2013/0097699 A1 | 4/2013 | Balupari et al. | |
| 2013/0174254 A1 | 7/2013 | Gould et al. | |
| 2013/0232574 A1* | 9/2013 | Carothers | G06F 21/56 726/22 |
| 2014/0007238 A1 | 1/2014 | Magee et al. | |
| 2014/0245436 A1 | 8/2014 | Dagon et al. | |
| 2016/0352679 A1* | 12/2016 | Hagen | H04L 61/1511 |
| 2017/0163603 A1 | 6/2017 | Xu | |
| 2018/0077117 A1* | 3/2018 | Hagen | H04L 63/1408 |

OTHER PUBLICATIONS

"Domain generation algorithm", <https://en.wikipedia.org/wiki/Domain_generation_algorithm>, retrieved Dec. 22, 2015, 3 pages.

Final Office Action from U.S. Appl. No. 14/978,209, dated Nov. 16, 2017, 12 pages.

Final Office Action from U.S. Appl. No. 14/978,209 dated Sep. 15, 2016, 11 pages.

Non-Final Office Action from U.S. Appl. No. 14/978,209, dated Jun. 14, 2017, 14 pages.

Notice of Allowance from U.S. Appl. No. 14/978,209, dated May 17, 2018, 5 pages.

Xu, et al., "We know it before you do: Predicting Malicious Domains", Virus Bulletin Conference, Sep. 2014, 5 pages.

Non-Final Office Action from U.S. Appl. No. 14/978,209, dated Apr. 14, 2016, 10 pages.

\* cited by examiner

METHODS AND SYSTEMS FOR IDENTIFICATION OF A DOMAIN OF A COMMAND AND CONTROL SERVER OF A BOTNET

CROSS-REFERENCE TO RELATED APPLICATIONS

This application is a continuation of U.S. application Ser. No. 14/978,209, filed Dec. 22, 2015, which is hereby incorporated by reference.

TECHNICAL FIELD

Embodiments of the invention relate to the field of network services; and more specifically to the identification of a domain of a command and control server of a botnet.

BACKGROUND ART

A botnet is a number of computing devices coupled within a network and communicating with other computing devices in an effort to complete repetitive tasks and objectives. For example, a botnet can be used to keep control of an Internet Relay Chat (IRC) channel, to send spam email or to participate in distributed denial-of-service attacks. Generally, botnets are considered malicious and a threat to a network, which needs to be detected and neutralized. A command and control server is a centralized computing device that is able to send commands and receive responses from the other computing devices part of the botnet.

Many botnets use a Domain Generation Algorithm (DGA) to identify the hostname of their command and control (C&C) servers. DGAs are algorithms used to periodically generate a large number of domain names that can be used as domains for command and control servers of botnet (or more generally for command and control servers of malware). The large number of potential command and control servers makes it difficult for law enforcement to effectively shut down botnets since infected computers will attempt to contact some of these domain names every day to receive updates or commands The DGAs are generally deterministic algorithm, time-based and custom for each malware family.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
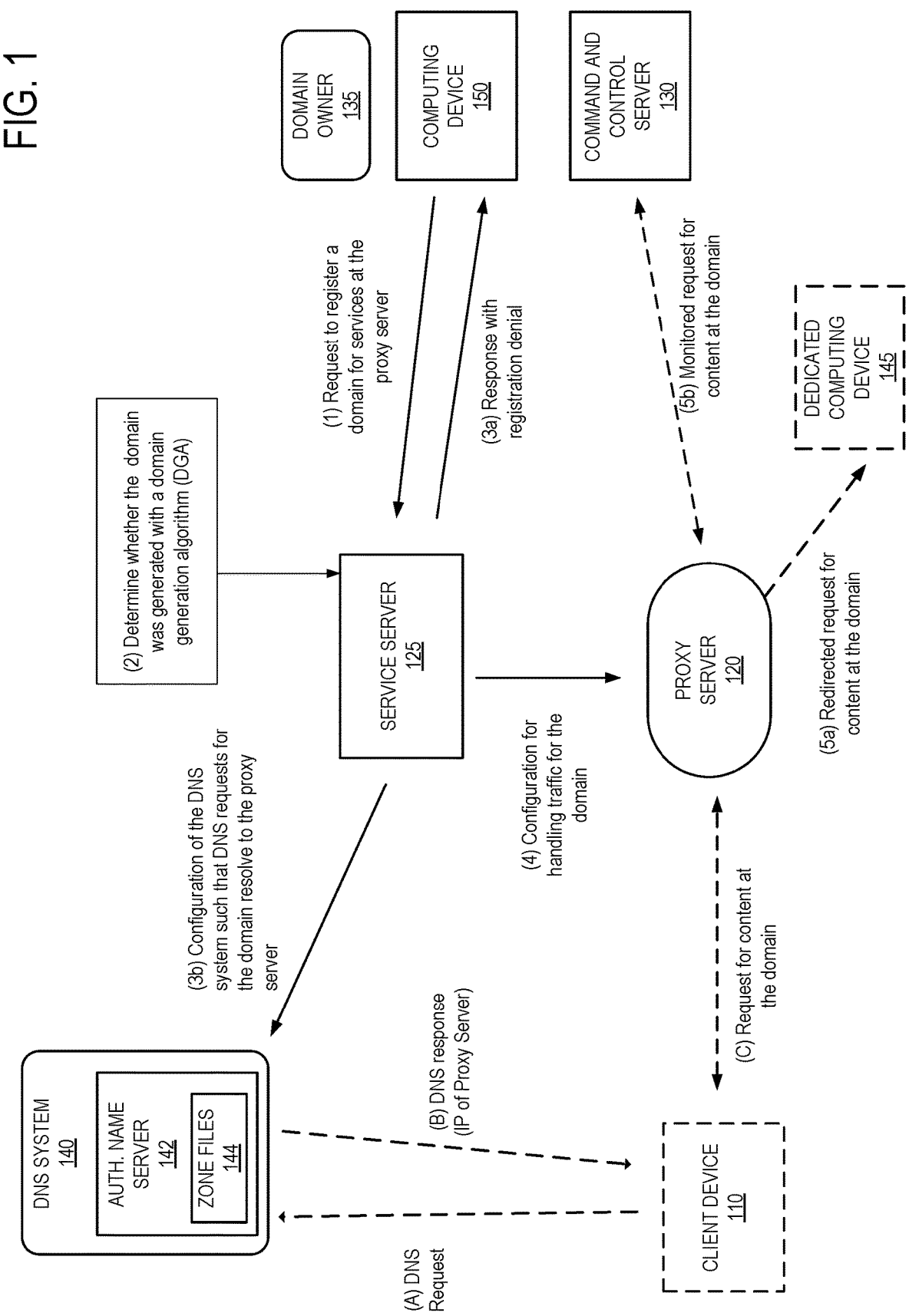
FIG. 1 illustrates an exemplary architecture of an Internet-based proxy service according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Methods and apparatuses for providing Internet-based proxy services (hereinafter "service") are described in an embodiment. The service, which is available over the Internet and does not require customers (e.g., owners of a domain and/or personnel working on behalf of domain owner) to install hardware or software, allows customers (e.g., owners of a domain) to protect their network against Internet-based threats; empower fast, reliable, and robust performance from their network resources; assist in protecting the Internet community by proactively stopping botnets, cleaning viruses, trojans, and worms; or any combination thereof. Unlike other products that require installation of hardware or software, the service described herein exists at the network level (and thus does not require customers to install hardware or software). In an embodiment, the service provides mechanisms for identifying a domain of a command and control server of a botnet. In an embodiment, upon receiving a request to register a domain for the service, a server determines whether the domain was generated by a domain generation algorithm (DGA). The identification of the domain being a domain of a command and control server is performed based on the determination that the domain was generated by a domain generation algorithm. Upon the identification of the domain as a command and control server of a botnet, the service may deny registration for the service for the domain. Alternatively, the service may accept registration for the service for the domain while keeping track of and monitoring communications for that domain. In addition, the service may accept registration for the service for the domain while redirecting traffic for the domain to a dedicated computing device enabling the service and/or a third party to monitor communication for the domain.

In some embodiments, customers may register for the service including by changing their authoritative name server to an authoritative name server of the service, and also changing the IP address(es) that resolve to their origin server(s) (which hosts content of their domain) to point to a proxy server of the service. In other embodiments, customers of the service change individual DNS records to point to a proxy server (or point to other domain(s) that point to a proxy server of the service). For example, the customers may change their DNS records to point to a CNAME that corresponds with a proxy server of the service.

FIG. 1 illustrates an exemplary architecture of the service according to one embodiment of the invention. A domain owner 135 is a potential customer of the service attempting to register the respective domain for the service. A domain owner may be the operator of a botnet who uses the computing device 150 to transmit a request to the service server 125 to register for service. In the example of FIG. 1, the domain owner 135 is an operator of a botnet and is attempting to register a domain that points to a command and control server of the botnet. The domain name is generated at the computing device 150 (or alternatively at another computing device communicatively coupled with the computing device 150) with a domain generation algorithm (DGA).

The command and control (C&C) server 130 is a computing device that transmits commands to multiple computing devices forming a network of bots (i.e., a botnet) (e.g., to client device 110 when the client device is part of the botnet), and receives reports or requests from these devices. In a botnet, the computing devices forming the network of bots, are infected with a Trojan horse and subsequently communicate with the command and control server using various communication channels (e.g., Internet Relay Chat (IRC), JPEG images, Microsoft Word files and/or posts from dummy accounts of social media platforms may be used as communication channels for transmitting/receiving commands between the command and control server and the bots of a botnet). The botnet can be used to gather information, such as credit card numbers, confidential information, private and personnel information etc. Depending on the purpose and structure of the botnet, the C&C server 130 might also issue commands to start sending spam or begin a distributed denial of service (DDoS) attack.

The computing device 150 (e.g., laptop, workstation, smartphone, palm top, mobile phone, tablet, gaming system, set-top box, etc.) is capable of accessing network resources (e.g., they include software such as web browsers that are capable of accessing network resources) to communicate with the service server 125. The computing device 150 is operative to request (at operation 1) registration for the service for a domain of the command and control server 130.

The service server 125, operated by the service, provides a set of tools and interfaces for domain owners and is accessible over the Internet. For example, the service server 125, among other things, allows domain owners (e.g., domain owner 135) to request registration for the service, and if registration is successful, the service server 125 allows the customers of the service to view statistics/logs of events, and report suspicious events. In an embodiment, the service server 125 identifies a domain of a command and control server of a botnet when a malicious customer attempts to register the domain for the service. In an embodiment, the service server 125 receives a request (at operation 1) to register, for the service, the domain of the command and control server 130. The service server 125 (at operation 2) determines whether the domain was generated with a domain generation algorithm (DGA). When the domain was generated with a domain generation algorithm, the service server 125 performs one of the following operations: deny registration (e.g., by sending the response 3a) of the domain for the service at the proxy server; or accept registration of the domain for the service and monitor communications for the domain. When registration of the domain is accepted, the service server 125 performs the following operations: configuring the DNS system 140 (e.g., by sending a message with configuration parameters (3b) to the DNS system) such that DNS requests for the domain resolve to the proxy server 120 resulting in the redirection of the traffic for the domain to the proxy server 120; and configuring the proxy server 120 (e.g., by sending a message with configuration parameters (4) to the proxy server 120) to handle traffic for the domain of the C&C server 130. In another embodiment, when registration of the domain is accepted the service server 125 may configure the DNS system 140 (e.g., by sending a message with configuration parameters (3b) to the DNS system) such that DNS requests for the domain resolve to dedicated computing device 145 instead of resolving to the C&C server 130 such that traffic addressed to the registered domain is monitored at the dedicated computing device 145.

The service server 125 configures the proxy server 120 to process communications directed at the domain of the command and control server 130. In an embodiment, the service server 125 configures the proxy server 120 to forward traffic for the domain to the command and control server 130 and to monitor and keep track of traffic for the domain. In another embodiment, the service server 125 configures the proxy server 120 to redirect traffic for the domain to a dedicated computing device 145. The dedicated computing device 145 may be communicatively coupled with the proxy server 120 to receive and process only traffic addressed to the domain of the command and control server 130. Although illustrated as a device separate from the proxy server 120, in an embodiment, the dedicated computing device 145 may be part of a proxy server cluster. In some embodiments, the dedicated computing device 145 is part of the Internet-proxy service, while in other embodiments the dedicated computing device 145 is owned and managed by a different entity (e.g., an Internet policing entity, a law enforcement entity, etc.).

The DNS system 140 is used to refer to the DNS system as a whole and includes multiple DNS servers to resolve DNS requests. In an embodiment, the DNS system 140 is configured (operation 3b) by the service server 125 such that a DNS request (A) for the domain resolves to the proxy server 120 (i.e., the DNS response (B) includes the IP address of the proxy server 120) or to the dedicated computing device 145 (i.e., the DNS response (B) includes the IP address of the dedicated computing device 145 that maybe outside of the service). As illustrated, the DNS system 140 may include the authoritative name server 142, which is an authoritative name server for the service. Thus, the authoritative name server 142 is the authoritative name server for the domains corresponding to origin servers (not illustrated). Accordingly, when the DNS system 140 resolves a request for a domain corresponding to one of the origin servers, the authoritative name server 142 provides the authoritative answer. It should be understood that the DNS system 140 includes more DNS servers (e.g., preferred domain servers, top-level domain name servers, other domain servers) than illustrated. It should also be understood that there may be multiple authoritative web servers for the service and they may be geographically distributed.

The client device 110 is a computing device (e.g., laptop, workstation, smartphone, palm top, mobile phone, tablet, gaming system, set-top box, etc.) that is capable of accessing network resources (e.g., it includes software such as a web browser or a web application that are capable of accessing network resources). A user at the client device 110 requests network resources (e.g., HTML pages, images, word processing documents, software updates, commands, PDF files, movie files, music files, or other computer files) through a client network application such as a web browser or other web application (e.g., FTP client, SSH client, Telnet client, IRC, etc.). The client device may be susceptible to being infected with viruses, worms, or other vulnerabilities and may be part of a botnet network.

The proxy server 120 is a computing device that is situated between the client device 110 and the command and control server 130. Certain network traffic passes through the proxy server 120 (e.g., traffic directed for the domain of the C&C server 130 when registration of the C&C server 130 to the service is accepted). Based at least in part on this traffic, the proxy server 120 provides a set of one or more services for the benefit of the customers of the service upon their registration for the service. In an embodiment, the proxy server 120 further enables the monitoring and/or redirection of traffic for the domain of the command and control server 130 of the botnet. For example, the proxy server 120 may provide one or more of the following services: forwarding traffic (5*b*) to and from the command and control server 130 while monitoring the traffic; forwarding traffic for the domain of the command and control server 130 to the dedicated computing device 145; and modifying the content of the request and/or the reply (which may be based on a set of one or more factors such as the content of the request, the content of the reply, and the characteristics of the requester).

While FIG. 1 illustrates a single proxy server 120, in some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

In some embodiments, when the proxy server 120 is configured to monitor traffic addressed to the command and control server 130, the proxy server 120 maintains a log of events. For example, the proxy server 120 logs each request that is received for the domain as well as each response that is transmitted to a visitor client device from the command and control server 130. Each proxy server in the service is assigned a unique identifier. Each log stores the server's unique identifier plus a timestamp plus additional information about the event that generated the log (e.g., the IP address of the visitor client device initiating the request, the previous server that relayed the request, the response, etc.). This allows the service to gather information regarding the botnet which may enable the service and or another entity to help shut down the botnet.

In an embodiment, each proxy server maintains its own logs and reports events in the logs to the service server 125 over the network. While in one embodiment the events are reported to the service server 125 in real time, in other embodiments the events are reported to the service server 125 differently (e.g., event logs are batched and transmitted to the service server 125 at regular intervals or as the system resources allow, event logs are batched and downloaded from the service server 125 at regular intervals or as the system resources allow, or other possible mechanisms).

In an embodiment, the service server 125 can maintain an event log data structure, which stores the events of the proxy servers. The service server 125 may sort the logs in order to retrieve multiple requests that constitute a single session by any particular visitor, even if the visitor's requests were made to multiple proxy servers. Data reports such as a list of IP addresses that have contacted the command and control server or attempted to contact it, types of requests sent to the command and control server, responses forwarded from the command and control server etc., can be extracted to understand the operations of the botnet. The service server 125 may report this data to a third party entity, which may disable and shut down the botnet based on the gathered information.

The client device 110 requests DNS resolution when a domain name is used or requested by a local application and is not known (e.g., is not in a local DNS cache or the DNS record in its local cache has expired). Consider the following example, where the client device 110 includes a bot which attempts to communicate with the domain kjygndawd.com of the command and control server 130. If the client device 110 does not know the IP address of kjygndawd.com, (e.g., the cache on the client device 110 does not have an entry for kjygndawd.com or it has expired), the client device makes a DNS request (A) to the DNS system 140 for the IP address for kjygndawd.com. In an embodiment, when the domain owner registers the domain for the service and the registration is accepted, the authoritative name server to the authoritative name server 142, and the DNS zone file has been changed so that the IP address returned by the authoritative name server 142 will be that of the proxy server 120. As such, the DNS system 140 performs a recursive or iterative DNS process until the authoritative name server 142 returns the IP address for the proxy server 120 in the DNS response (B).

Sometime after the DNS resolution is complete and the client device 110 learns the IP address that points to kjygndawd.com (which is the IP address of the proxy server 120), the client device 110 makes the request (C) (e.g., request for an update from the C&C server 130, or a request for a command), which is transmitted to the proxy server 120. The proxy server 120 analyzes the request and determines a set of one or more request related actions to perform based on the results of the analyzing. Examples of request related actions that may be performed by the proxy server 120 include the proxy server 120 redirecting the request (5*a*)

to the dedicated computing device 145, transmitting the request (5*b*) to the C&C server 130 and log the request in the event log database; and blocking the request.

In an embodiment, when the proxy server 120 determines that the request is addressed to C&C server of a botnet (e.g., command and control server 130), the proxy server may transmit a response to the client device which includes a block page indicating that the visitor has been blocked. In some embodiments, the proxy server 120 reduces the speed at which content can be delivered to a client device 110 responsive to determining that the visitor and/or the request is addressed to a C&C server of the botnet. For example, the proxy server 120 turns down the number of bytes per second that can be delivered through it for the connection.

Figure 2:
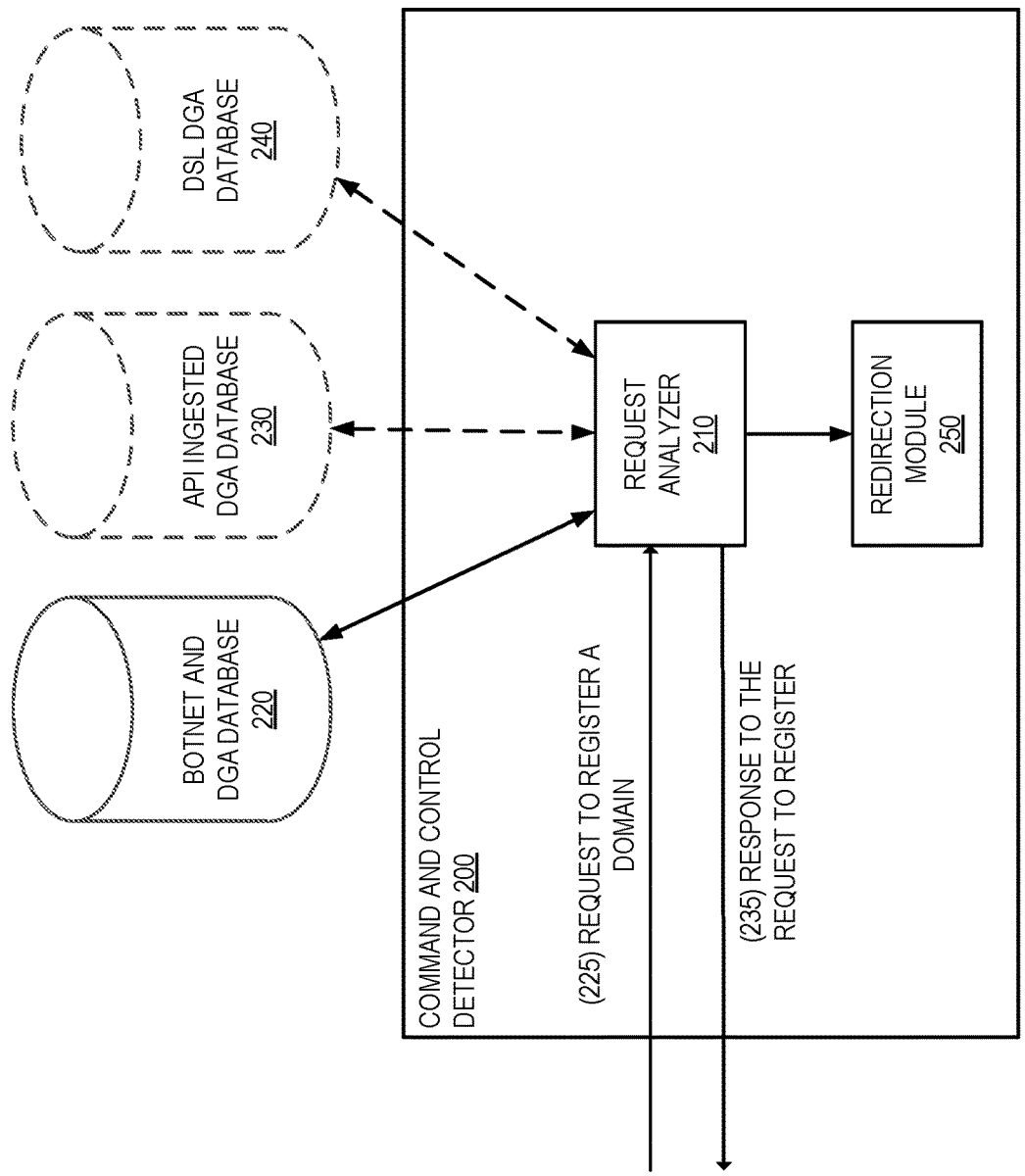
FIG. 2 is a flow diagram illustrating exemplary operations for identifying a command and control server according to one embodiment of the invention.

FIG. 2 is a block diagram illustrating an exemplary command and control detector 200 of the service server 125 that processes requests to register a domain for the service according to one embodiment of the invention. The command and control detector 200 includes the request analyzer 210, and the redirection module 250. The request analyzer 210 receives and analyzes the request 225. The request 225, which is received from a computing device (e.g., computing device 150) operated by a botnet operator, is a request to register the domain of the command and control server 130 for the service. The request analyzer parses the request 2125 and determines whether the domain of the command and control server 130 was generated with a domain generation algorithm.

In one embodiment, the request analyzer 210 determines whether the domain was generated with a domain generation algorithm by querying the botnet and DGA database 220 to determine whether the domain was generated by a DGA from a list of known DGAs stored in the database 220. The request analyzer may retrieve one or more DGAs from the database 220, and run the one or more DGAs with a current parameter (e.g., the date of the current day, one or more time entries, a combination of time and date, etc.) to obtain a set of one or more potential domain names to be compared with the domain received in the request 225. The database 220 stores a list of all botnet and domain generation algorithms known and used by current botnets. In an embodiment, the request analyzer 210 periodically runs the set of DGAs stored in the database 220 with a parameter (e.g., date of the day) to determine a list of potential malicious domains that can be used by botnets for the command and control server 130. This list is stored in a database (e.g., 220) and upon receipt of a request to register for service, the request analyzer compares the domain included in the request with the list of potential domains generated with the current DGAs. If the domain is one of the potential malicious domains, the service server 125 transmits a response 235 to the computing device that is requesting the registration. The response 235 can include one of a confirmation that the registration for the service is successful or alternatively a denial of registration for the service. In an embodiment, where the registration for the service is denied, the service server 125 can log in the event log database the requested domain and the identity of the client device from which the request is received (e.g., the IP address and/or cookie of the computing device 150). The service server 125 can use this information or transmit it to a third party entity (e.g., law enforcement authority) to help block or disable the operations of the botnet. In an embodiment, where registration is accepted, the redirection module 250 is used to configure the DNS system 140 such that DNS requests for the domain will resolve to the proxy server 120 or alternatively to a dedicated machine (e.g., dedicated computing device 145) that maybe outside of the service. The registering of the domain for the service will be described in further details with reference to FIGS. 4A-B.

In one embodiment, the request analyzer 210 determines whether the domain was generated with a domain generation algorithm by querying the API ingested DGA database 230 or the Mathematical Domain Specific Language (DSL) DGA database 240. In an embodiment, the DGA algorithms stored at the botnet and DGA database 220 are parsed and converted into API ingested DGA of the service server 125. In an embodiment, the DGA algorithms stored at the botnet and DGA database 220 are parsed and converted into a Mathematical Domain Specific Language. As the DGAs are generally implemented based on simple functions applied to a current parameter, a Mathematical DSL can be used to implement these algorithms and store them in database 240. In this embodiment, the request analyzer 210 uses the database 230 or 240 instead of the DGA database 220 (which contains DGA algorithms implemented in General Purpose Languages) to determine whether the domain was generated by a DGA from a list of known DGAs. The request analyzer may retrieve one or more API converted DGAs from the database 230 or Mathematical DSL converted DGAs from the database 240, and run the one or more DGAs with a current parameter (e.g., the date of the current day, one or more time entries, etc.) to determine a set of one or more potential domain names to be compared with the domain received in the request 225. Each of the databases 230 and 240 stores a list of all botnet and domain generation algorithms known and used by current botnets and respectively converted into an API of the service server 125 or a Mathematical DSL.

In an embodiment, the request analyzer 210 runs the set of the API ingested DGAs stored in the database 230 Mathematical DSL converted DGAs with a parameter (e.g., date of the day) to determine a list of potential malicious domains that can be used by botnets for the command and control server 130. This list is stored in the database (e.g., 230, and 240) and upon receipt of a request to register for service, the request analyzer compares the domain included in the request with the list of potential domains generated with the current DGAs. If the domain is one of the potential malicious domains, the service server 125 transmits a response 235 to the computing device requesting the registration. The response 235 can include one of a confirmation that the registration for the service is successful or alternatively a denial of registration for the service. In an embodiment, where the registration for the service is denied, the service server 125 can log in the event log database for requests to the requested domain and the identity of the client device from which the request is received (e.g., the IP address and/or cookie of the computing device 150). The service server 125 can use this information or transmit it to a third party entity that may block or disable the operations of the botnet. In an embodiment, where registration is accepted, the redirection module 250 is used to configure the DNS system 140 such that DNS requests for the domain will resolve to the proxy server 120. The registering of the domain for the service will be described in further details with reference to FIGS. 4A-B.

In an embodiment, the request analyzer 210 determines that the domain included in the request to register for the service (225) was generated with a DGA and accepts registration of the domain for the service at the proxy server. The request analyzer calls the redirection module 250 to configure the proxy server with appropriate parameters for handling traffic for the domain. The redirection module 250 configures the proxy server to perform one of the following operations: forward traffic for the domain to the command and control server 130 while monitoring and logging communications between the command and control server 130 and any client devices that may communicate with it; redirecting traffic for the domain to a dedicated computing device (e.g., dedicated computing device 145); and blocking traffic received from client devices for the domain. The proxy server 120 may be configured by the redirection module 250 to perform any one or a combination of the operations above. For example, the proxy server 120 is configured to redirect traffic to the dedicated computing device as well as to the command and control server 130 while logging information regarding the requests and responses sent and received from the C&C server 130.

In an embodiment, upon receipt of a request destined for the command and control server 130 from the client device 110, the proxy server transmits the request (5b) to the C&C server 130 on behalf of the client device. In an embodiment, the proxy server may further transmit the request to the dedicated computing device in addition to transmitting it to the command and control server 130. Prior to transmitting the request, the proxy server can enter a log in the log event database for reporting the malicious request. The request transmitted by the proxy server 120 to the C&C server 130 on behalf of the client device 110 may be substantially similar to the original request (C) or it may be modified by the proxy server 120. The command and control server 130 responds to the request as if the request was being transmitted from a client device directly. The response may include a command or an update to the bot software. The proxy server 120 receives the response and may forward it to the client device and/or to the dedicated computing device 145. In an embodiment, the response is blocked and not transmitted to the client device 110 and only transmitted to the dedicated computing device 145. In an embodiment, the response is entered in the log event database to be added to a report regarding the botnet controlled via the C&C server 130.

Figure 3:
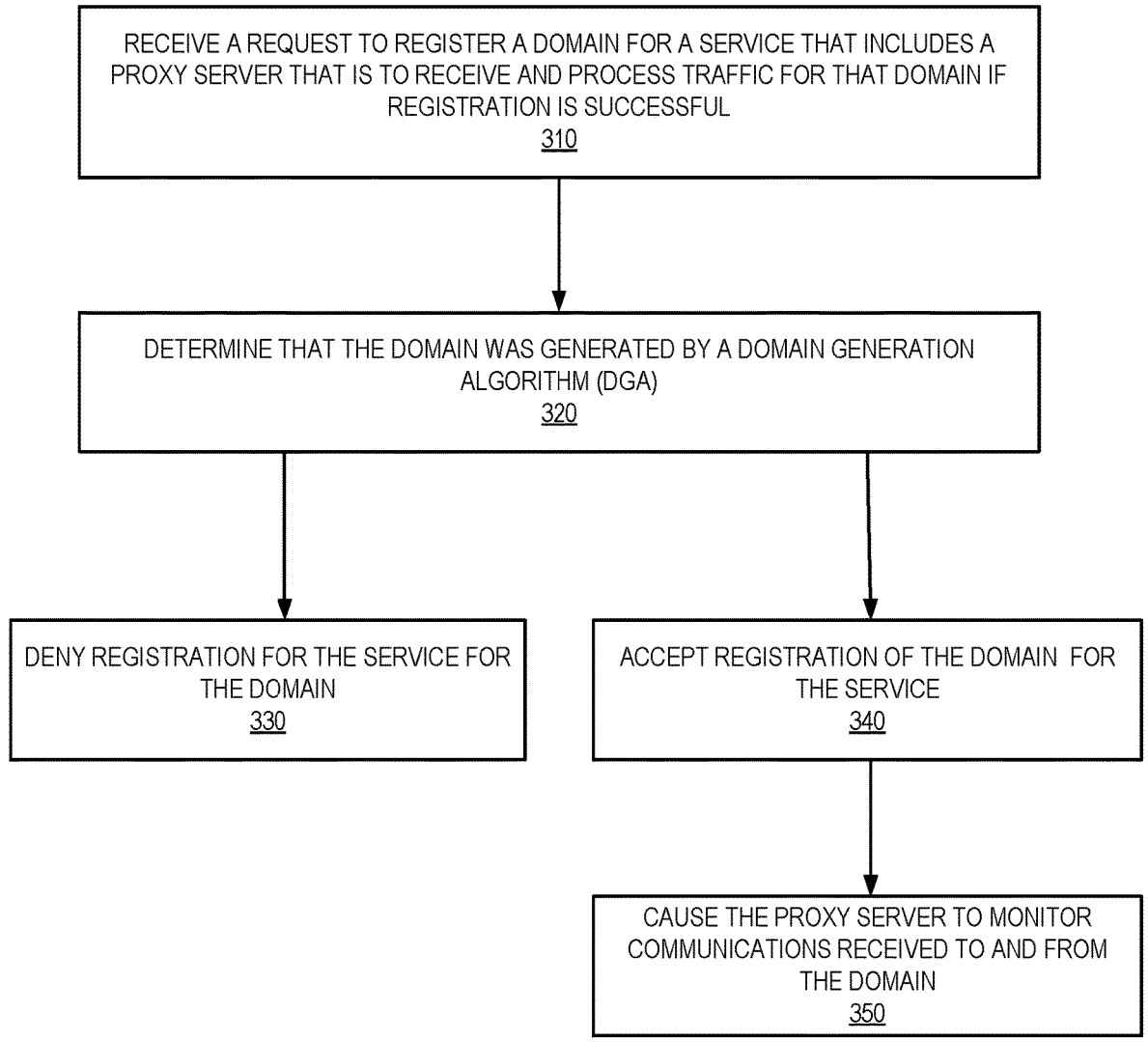
FIG. 3 is a block diagram illustrating an exemplary command and control detector according to one embodiment of the invention.

FIG. 3 is a flow diagram illustrating exemplary operations for identifying a domain of command and control server of a botnet in accordance with one embodiment of the invention. The operations in the flow diagram of FIG. 3 will be described with reference to the exemplary embodiments of FIGS. 1-2. However, it should be understood that the operations of the flow diagram can be performed by embodiments of the invention other than those discussed with reference to FIGS. 1-2, and the embodiments of the invention discussed with reference to FIGS. 1-2 can perform operations different than those discussed with reference to the flow diagram.

At block 310, the service server receives a request to register a domain for the service, where the service includes a proxy server that is to receive and process traffic for that domain if registration is successful. Flow then moves to block 320, where the service server determines whether the domain was generated by a domain generation algorithm. In one embodiment, the service server 125 determines whether the domain was generated with a domain generation algorithm by querying the botnet and DGA database to determine whether the domain was generated by a DGA from a list of known DGAs stored in the database. In an embodiment, the service server is operative to periodically run the set of the DGA stored in the database with a parameter (e.g., date of the day) to determine a list of potential malicious domains that can be used by botnets for the command and control server 130. This list is stored in a database and upon receipt of a request to register for services, the service server 125 compares the domain of the request with the list of potential domains generated with the current DGAs.

When the service server 125 determines that the domain was generated by a DGA, the service server 125 performs one of the following operations: deny registration for the service for the domain (operation 330) or alternatively accept registration for the service for the domain (operation 340). In an embodiment, where the registration for the services is denied, the service server 125 can log in the event log database the requested domain and the identity of the client device from which the request is received (e.g., the IP address and/or cookie of the computing device 150). The service server 125 can use this information or transmit it to a third party entity (e.g., law enforcement authority) to help block or disable the operations of the botnet. When registration for the service is accepted, flow moves from block 340 to block 350 where the service server 125 causes the proxy server 120 to monitor communications received to and from that domain. The service server 125 configures the DNS system 140 such that DNS requests for the domain resolve to the proxy server 120; and configures the proxy server to handle communication for the domain.

In an embodiment, the proxy server 120 is configured to handle traffic for the domain. Upon receipt of a request addressed for the domain of the command and control server, the proxy server 120 analyzes the request and determines a set of one or more request related actions to perform based on the results of the analyzing and the configuration received from the service server for the domain. Examples of actions that may be performed by the proxy server 120 include the proxy server 120 redirecting the request (5a) to the dedicated computing device 145; transmitting the request (5b) to the C&C server 130 and log the request in the event log database; and blocking the request.

Registering for Service

When the registration of a domain for service is accepted for example as described in Figure 340 of FIG. 3, the server service 125 proceeds to registering the domain for the service. In an embodiment, the registering for the service is performed according to embodiments discussed with reference to FIGS. 4A-B as it will be described in further detail below. In other embodiments, the registering for the service is performing according to the embodiments described with reference to FIG. 5 as it will be described in further detail below.

Figure 4A:
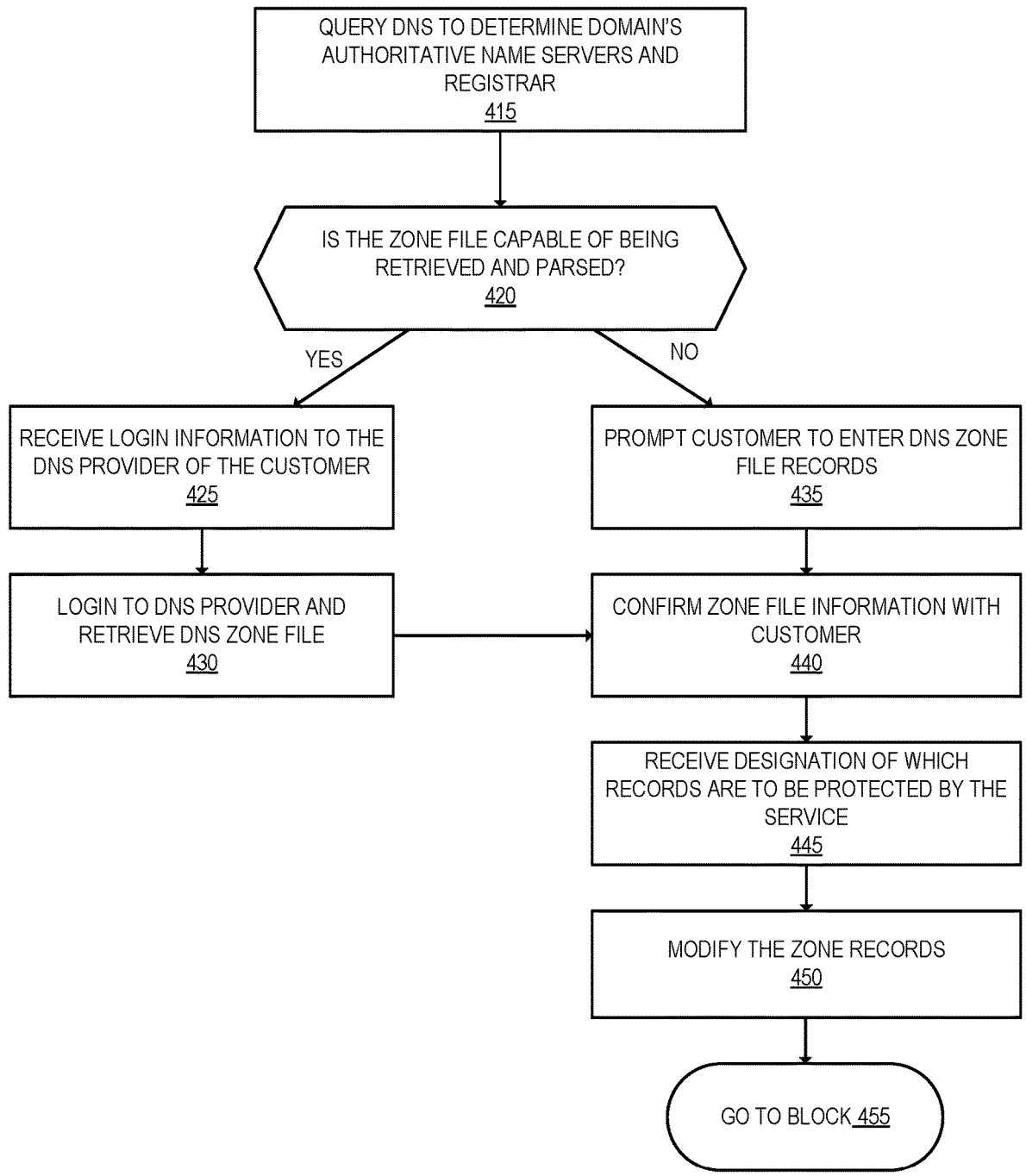
FIGS. 4A-B are flow diagrams illustrating exemplary operations for a customer to use the service server to register for service according to one embodiment.
Figure 4B:
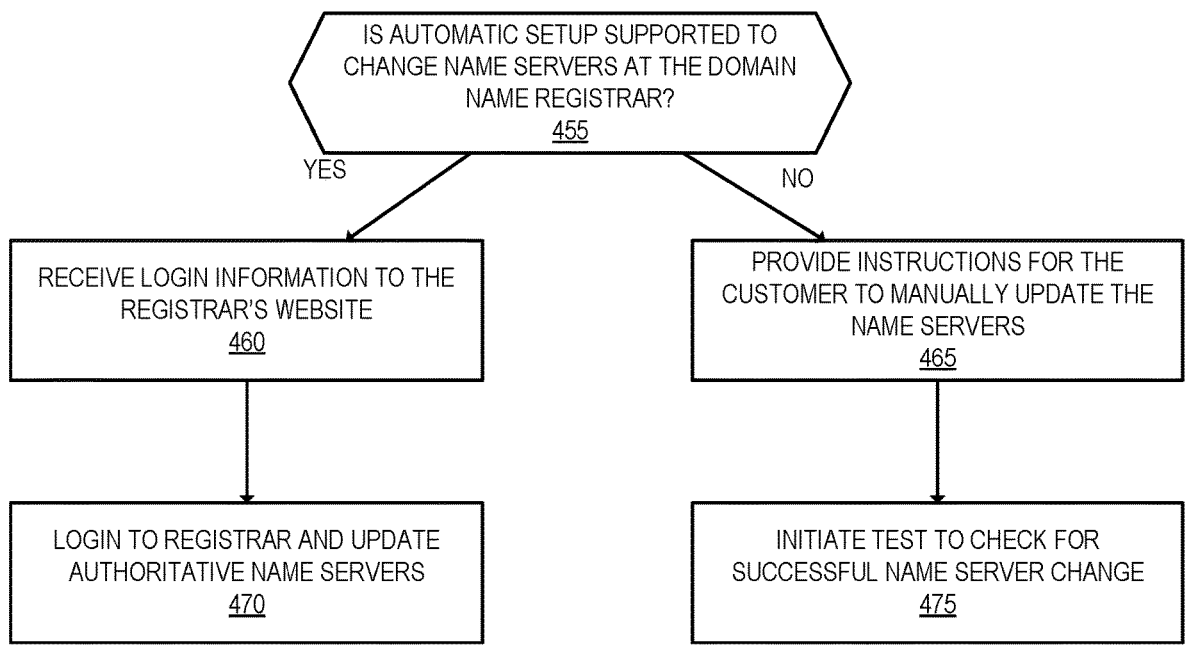

FIGS. 4A-B are flow diagrams illustrating exemplary operations for a customer to use the service server 125 to register for service according to one embodiment. The operations of FIGS. 4A-B will be described with reference to the service server 125; however it should be understood that the operations of FIGS. 4A-B can be performed by embodiments other than those discussed with reference to the service server 125 and the service server 125 can perform operations different than those discussed with reference to the operations of FIGS. 4A-B. In addition, the operations of FIGS. 4A-B will be described with reference to the domain owner 135, which owns the domain kjygndawd.com and is hosted by the command and control server 130.

At block 415, the service server 125 queries the global DNS system to determine the authoritative name servers and domain name registrar for the domain (e.g., kjygndawd.com). Flow then moves to block 420, where the service server 125 determines whether the current information in the DNS zone file for the domain is capable of being retrieved by the service server 125 in order to avoid the domain owner 135 from inputting the information. For example, some DNS providers may provide an API (Application Programming Interface) that can be used by the service server 125 to query for the information in the DNS zone file for the domain. The list of DNS providers that provide such an API and information of how to use the API is stored by the service server 125. As another example, the service server 125 may simulate a human user logging into the DNS provider's website to determine the information in the DNS zone file. In such a case, the service server 125 accesses a map of the DNS provider's website that has been pre-recorded by an operator of the service and stored by the service server 125. The map includes the web page on which the user login information is entered, the particular fields into which the login information is entered, the page or pages on which the zone information is displayed, the structure of those pages, and any links or URLs to request additional pieces of the zone file from the DNS provider. If the DNS zone file is capable of being retrieved, then flow moves to block 425, otherwise flow moves to block 435.

At block 425, the service server 125 receives login information (e.g., username and password) to the DNS provider's website from the domain owner 135. For example, the service server 125 may provide a DNS provider login information input form to allow the domain owner 135 to input their username and password for the DNS provider into a username field and password field respectively. The domain owner 135 submits the login information to the service server 125 by selecting the submit button. Flow moves from block 425 to block 430.

At block 430, the service server 125 logs into the DNS provider website using the login information and retrieves the information from the DNS zone file record for the domain. For example, if the DNS provider provides an API for querying the information in the DNS zone file for the domain, the service server 125 uses that API to query for the zone file information. If there is not such an API, the service server 125 queries the DNS provider via a service server-controlled agent (e.g., using HTTP or HTTPS protocols). For example, the service server 125 may request the login page, enter any required login information, submit the login page, request one or more pages where the zone file is displayed, store the response from those pages, scan the pages based on the predefined map to retrieve the zone information, and logout of the DNS provider. Flow moves from block 430 to block 440.

Referring back to block 435 (the information in the zone file is not capable of being retrieved by the service server 125), the service server 125 prompts the domain owner 135 to enter the information for the DNS zone file record for the domain. For example, a user interface provided by the service server 125 can be used to allow domain owners to enter the information for the DNS zone file records. The user interface can be used to allow domain owners to indicate for each record a resource record type (e.g., A, CNAME, NS, MX, LOC, etc.), a name, resource record type specific data, and a time-to-live (TTL) value. Flow moves from block 435 to block 440. The service server 125 may also provide a tool to assist the domain owner 135 in manually entering in the information to prevent mistakes.

The service server 125 can further assist domain owners in manually entering DNS zone file information according to one embodiment. The service server 125 may receive a keystroke input from the domain owner 135 for one of the resource record type fields. Next, the service server 125 queries the global DNS system for the keystroke input to determine if there is a matching record. The service server 125 then determines whether the global DNS system indicates that there is no record for the queried entry. If there is no record, the domain owner 135 may enter more keystroke input. If there is at least one matching record, then the service server populates the field with one or more suggestions. If the service server 125 receives another keystroke from the domain owner 135, then the suggestion(s) are cleared and the domain owner enter another keystroke input. If more keystrokes are not entered by the domain owner 135, then the service server 125 waits for the domain owner 135 to select one of the suggestions or add more keystrokes.

Referring back to FIG. 4A, at block 440, the service server 125 displays the zone file information to the domain owner 135 to allow the domain owner 135 to confirm its accuracy. The domain owner 135 may also edit the information if it is not accurate. Flow then moves to block 445 where the service server 125 receives from the domain owner 135 designation of which records in the zone file are to be protected by the service. For example, the domain owner 135 indicates at least that the address record (e.g., record type A or AAAA) of the domain (e.g., kjygndawd.com) is protected by the service. Flow moves from block 445 to block 450.

At block 450, in one embodiment, the service server 125 modifies the DNS zone record(s) designated by the domain owner 135 and the DNS authoritative name servers for the domain to that of the service. For example, the address pointing to the resource record type A (or AAAA) of the domain (e.g., kjygndawd.com) is changed to an IP address of a proxy server such as the proxy server 120, and the authoritative name servers are changed to authoritative name servers of the service (e.g., including the authoritative name server 142). The proxy server 120 may be one of multiple proxy servers in the service. The service server 125 may choose one of the proxy servers in a number of ways (e.g., based on current and/or expected load, based on location, round robin, etc.). In another embodiment, the service server 125 modifies the DNS zone record(s) designated by the domain owner 135 and the DNS authoritative name servers for the domain to that of a dedicated computing device (which is not part of the service). For example, the address pointing to the resource record type A (or AAAA) of the domain (e.g., kjygndawd.com) is changed to an IP address of the dedicated computing device 145, and the authoritative name servers are changed to authoritative name servers hosted on the dedicated computing device 145. Flow moves from block 450 to block 455.

At block 455, the service server 125 determines whether it supports an automatic setup procedure to change the authoritative name servers at the domain name registrar for the domain. For example, some domain name registrars may provide an API that can be used by the service server to change the authoritative name servers for the domain. The list of domain name registrars that provide such an API and information of how to use the API is stored by the service server 125. As another example, the service server 125 may simulate a human user logging into the domain name registrar's website to change the authoritative name servers for the domain. In such a case, the service server 125 accesses a map of the domain name registrar's website that has been pre-recorded by an operator of the service and stored by the service server 125. The map includes the login page, any fields where the login information is entered, the path to the page on which the authoritative name servers are changed, the fields that must be updated for those authoritative name servers to be changed, and any interface provided to delete name servers. If the service server supports automatic changing of the authoritative name servers at the domain name registrar for the domain, the flow moves to block 460; otherwise flow moves to block 465.

At block 460, the service server 125 receives login information (e.g., username and password) to the domain name registrar's website from the domain owner 135. For example, the service server 125 provides a domain name registrar login information input form on a user interface to allow the domain owner 135 to input their username and password for the domain name registrar into a username field and password field respectively. The domain owner 135 submits the login information to the service server 125 by selecting the submit button. Flow moves from block 460 to block 470.

At block 470, the service server 125 logs into the registrar's website and updates the authoritative name servers to that of the service. Flow then moves to block 475 where the service server 125 initiates a test to check to determine whether the authoritative name servers have been successfully changed. For example, the service server queries the global DNS system (e.g., with a dig operation, whois operation, etc.) for the domain to confirm that the authoritative name servers have been successfully changed. It should be understood that it may take some amount of time for the change of the authoritative name server to propagate throughout the global DNS system.

In another embodiment, the customer uploads a file representing the DNS zone file (e.g., a DNS bind file, a spreadsheet, or other format that designates the subdomains, record types, TTLs, and the records they resolve to). In another embodiment, the initial zone data is gathered from data retrieved from a recursive DNS provider. For example, for a particular domain, the recursive DNS provider may provide information indicating all of the subdomains that they have made a query for the domain.

Figure 5:
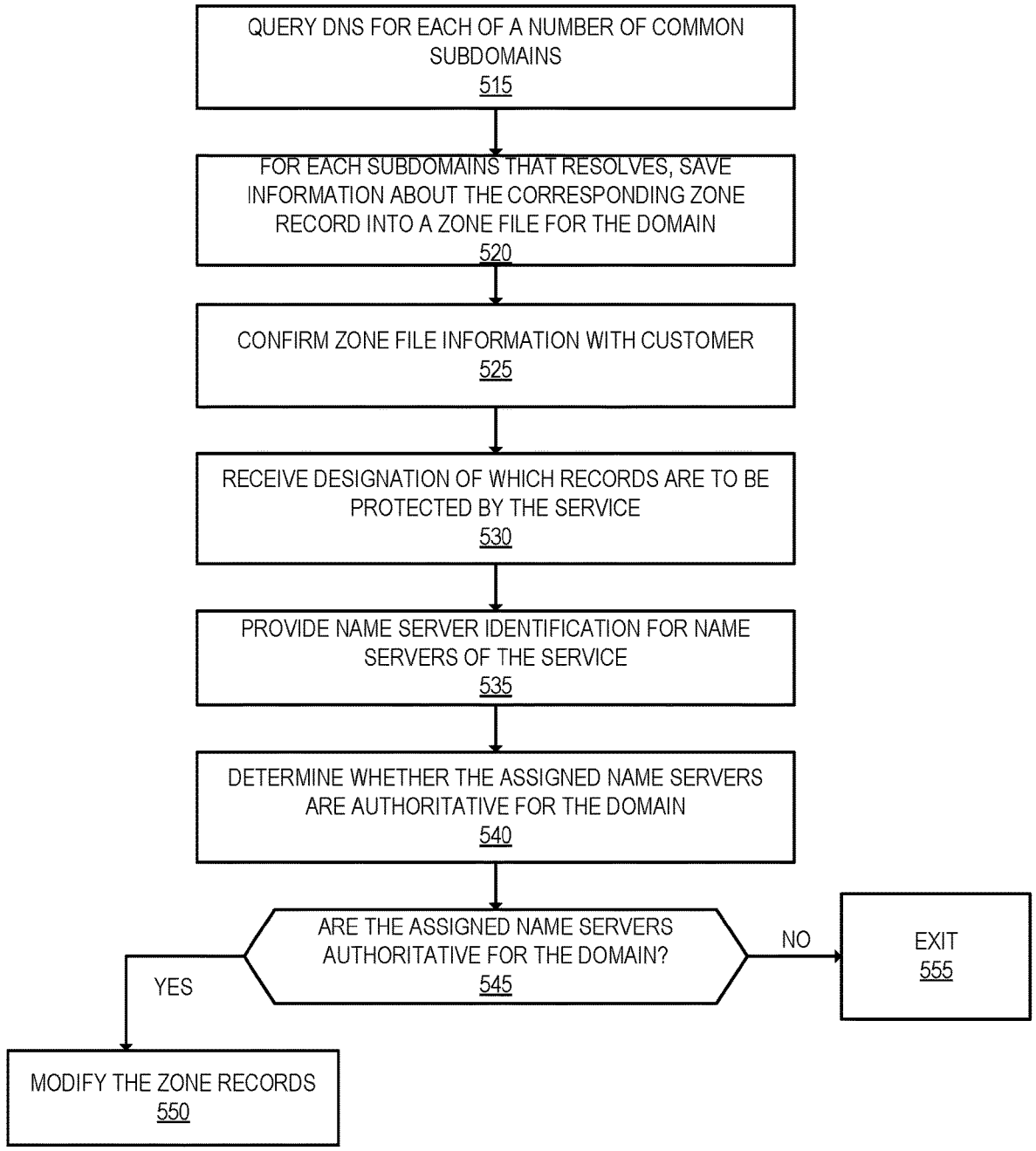
FIG. 5 is a flow diagram illustrating exemplary operations for registering for service where the initial zone data is gathered by making DNS queries for a number of common subdomains according to another embodiment.

In other embodiments, following the acceptation to register the domain for the service (for example at operation 340 of FIG. 3), the service server 125 proceeds to the registering of the domain for the service as described with reference to FIG. 5. In these embodiments, the initial zone data for a domain is gathered by making DNS queries for a number of common subdomains to see what resolves. FIG. 5 is a flow diagram illustrating exemplary operations for registering for service where the initial zone data is gathered by making DNS queries for a number of common subdomains according to another embodiment. The operations of FIG. 5 will be described with reference to the service server 125; however it should be understood that the operations of FIG. 5 can be performed by embodiments other than those discussed with reference to the service server 125 and the service server 125 can perform operations different than those discussed with reference to the operations of FIG. 5. In addition, the operations of FIG. 5 will be described with reference to the domain owner 135, which owns the domain kjygndawd.com and is hosted by the command and control server 130.

At block 515, the service server 125 queries, or causes a query to be issued to the DNS system 140 for each of a number of common subdomains (e.g., www. kjygndawd. com, blog. kjygndawd.com, web. kjygndawd.com, mail.kjygndawd.com, ftp.kjygndawd.com, etc.). For example, in one embodiment, the service server 125 stores a list of subdomains that are ranked into the likelihood that they will appear in a zone for a domain. The subdomains may be tested sequentially or in parallel.

In one embodiment, the number of DNS queries per second can be limited to not exceed a certain number of queries per second in order to not trigger anti-abuse systems with the DNS provider. The query period can either run through the entire list of subdomains testing all of them and finish when completing, or it can run through only a partial list and finish when a certain amount of time has passed (e.g., query as many possible in 1 minute). As new zones are added, the service server 125 can continue to adjust the order of the tested subdomains (e.g., determine what percentage of zones contain a certain subdomain then order them based on those percentages). In this way, the list of common subdomains becomes more accurate and efficient. Third party information, such as information from Recursive DNS Providers, can also be used in order to create the ranking list.

Flow moves from operation 515 to operation 520. At operation 520, for each of the subdomains tested that resolves, the service server 125 saves information about the record into a zone file for the domain (e.g., the record type, the TTL value, and the record).

Flow then moves to operation 525 and the service server 125 confirms the zone file information with the customer. For example, the service server 125 may allow customers to confirm resource records, add resource records, modify resource records, and/or delete resource records using a zone file record screen of a web user interface. The zone file record screen can include the records determined from the testing of the subdomains in operation 515. The zone file record screen can also allow the customer to provide records that were not found during the testing of the common subdomains. For example, the zone file record screen can allow domain owners to indicate for each record a resource record type (e.g., A, CNAME, MX, TXT, SPF, AAAA, NS, SRV, LOC), a name, resource record type specific data, and a TTL value. The service server 125 may also provide a tool to assist the customer in manually entering in the information to prevent mistakes.

Flow moves from operation 525 to operation 530 where the service server 125 receives designation of which records are to be protected by the service. For example, the service server 125 may enable customers to configure certain one(s) of their subdomains (e.g., kjygndawd.com) to be protected by the service (e.g., point to the proxy server 120) using a configuration screen of a web user interface. For example, the configuration screen can include a protection field that can be used by customers to indicate which one(s) of their records is to be protected by the service. In one embodiment, the service server 125 stores a list of subdomains that it knows are valid to be protected and default those records as being protected (e.g., "www," "blog," "web", etc.). In another embodiment, the service server 125 stores a list of subdomains that it knows should not be protected by the service and default those to be not protected by the service while making the other records protected by the service (e.g., "database", "mail", or any MX records). The customer may override the defaults.

Flow moves from operation 530 to operation 535 where the service server 125 provides name server identification for name servers of the service. For example, the service server 125 can provide a number of name server addresses of the service via a name server configuration screen of the web user interface. A customer changes their name servers to point to the name servers given to demonstrate that the customer has the authority to change the DNS records. In one embodiment, the service server 125 provides multiple subdomains for name servers that include a unique code in order to ensure that two registrants for the same domain do not register the same code. For example, if Alice and Bob both claim to register kjygndawd.com, Alice could be provided the name servers ns21.systemdns.com and ns39.systemdns.com. Bob could be provided the name servers ns14.systemdns.com and ns87.systemdns.com. The system could periodically check what name servers are authoritative for kjygndawd.com, or could check when the system first begins to receive traffic for kjygndawd.com. Upon doing so, if ns21 and ns39 are set as the authoritative name servers for kjygndawd.com then the system would know Alice's settings are authoritative and could propagate them. On the other hand, if ns14 and ns87 were authoritative name servers for kjygndawd.com then the system would know Bob's records were authoritative and would propagate them. In one embodiment, a single domain or combination of domains used as unique name servers for multiple registrants can be used. For example, a single name server with a code (e.g., 1257799302.systemdns.com) or multiple domains (e.g., systemdns.com and dnsauth.com).

In an alternative embodiment, in order to verify the authority of the customer to change the DNS records for the domain, the service server 125 queries the customer to add a unique record to their existing DNS file. This record could be of any valid DNS record type. In one example, a customer could add a TXT record with a unique string of characters. The system could check for the presence of this TXT record and, if the string of characters matched, designate the customer who was issued that string of characters in association with that domain as authoritative for the domain. Once that happened, the customer's settings could be propagated any future changes to those settings trusted.

Flow moves from operation 535 to operation 540 where the service server 125 determines whether the name servers provided in operation 535 have been modified to be authoritative for the domain. In one embodiment, the service server 125 periodically checks whether the name servers provided in operation 535 are authoritative for the domain. In other embodiments, the customer indicates when the name servers assigned by the service are authoritative for the domain. For example, the service server 125 may provide an interface for the customer to indicate that the assigned name servers are authoritative for the domain (e.g., through a button, etc.). In other embodiments, the customer may call a telephone number, send a text message, or send an email to indicate that the assigned name servers are authoritative for the domain. Regardless of the way, after receiving an indication from the customer that the assigned name servers have been changed to be authoritative for the domain, the service server 125 (or other server of the service) checks whether the assigned name servers are indeed authoritative for the domain. If the assigned name servers have been changed to be authoritative for the domain, then flow moves to operation (determined at operation 545), then flow moves to operation 550, otherwise flow moves to operation 555 and the operation exits (the customer did not prove that they had authority to change the DNS records).

At operation 550, in one embodiment, the service server 125 modifies (or causes to be modified) those DNS zone record(s) that are designated to be protected by the service. For example, the address pointing to the resource record type A (or AAAA) of the domain (e.g., kjygndawd.com) is changed to an IP address of a proxy server such as the proxy server 120. In one embodiment, the zone file records 144 (including the updated zone file records) are stored by the name server 142. The proxy server 120 may be one of multiple proxy servers in the service. The service server 125 may choose one of the proxy servers in a number of ways (e.g., based on current and/or expected load, based on location, round robin, etc.). In another embodiment, the address pointing to the resource record type A (or AAAA) of the domain (e.g., kjygndawd.com) is changed to an IP address of the dedicated computing device 145.

Figure 6:
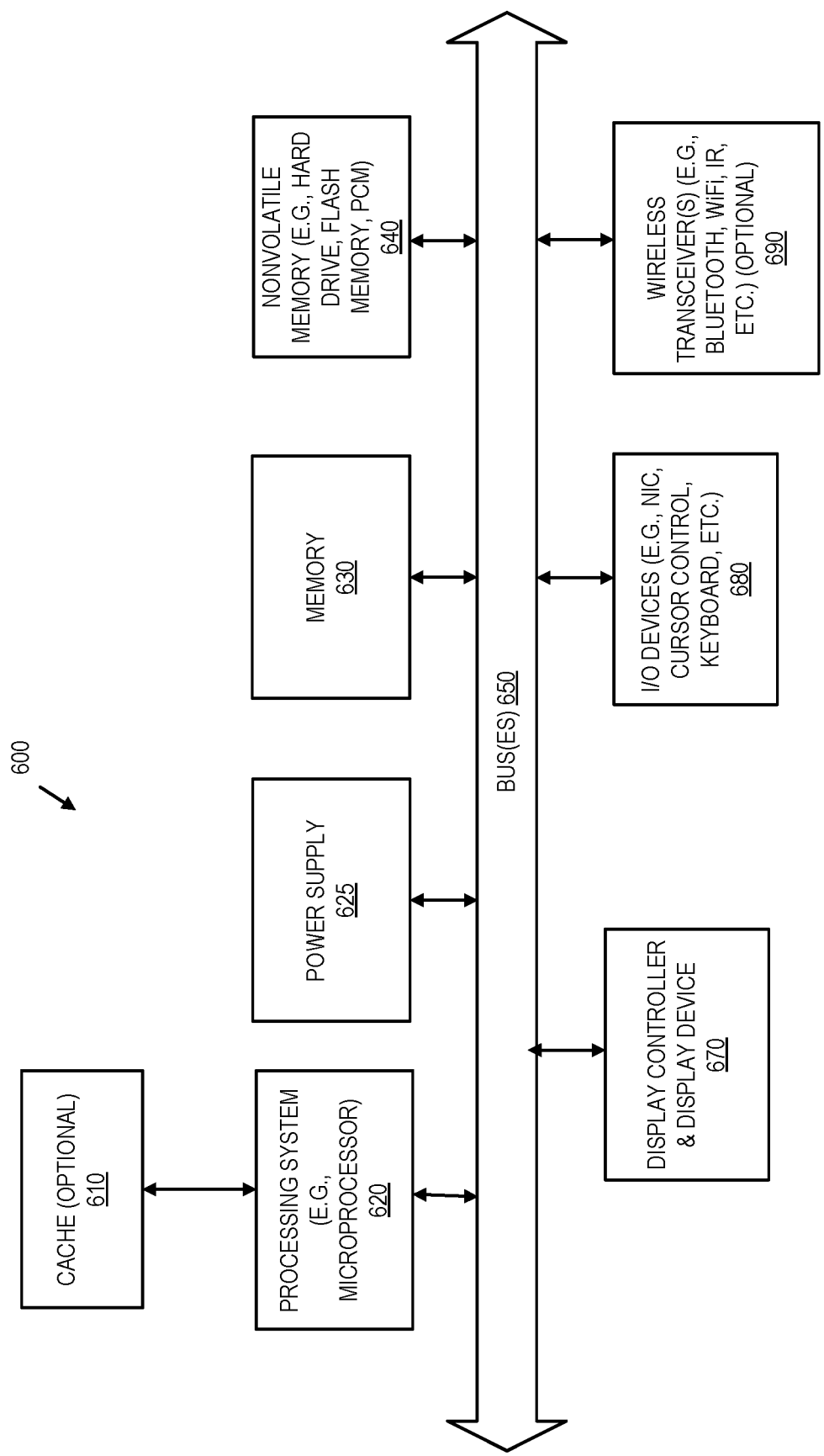
FIG. 6 is a block diagram illustrating an exemplary computer system according to one embodiment of the invention.

As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client device 110, the service server 125, the proxy server 120, the dedicated computing device 145, the command and control server 130 and/or the computing device 150 can take the form of the computer system 600.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a service server for identifying a domain of a command and control server of a botnet, the method comprising:

receiving, from a computing device, a request to register a domain for a service that includes a proxy server that is to receive and process traffic for that domain instead of the command and control server if registration is successful;

upon receiving the request to register the domain for the service and prior to accepting or denying the registration, determining that the domain was generated by a domain generation algorithm (DGA), wherein the determining includes:

retrieving a current set of DGAs from a database storing a list of DGAs known and used by botnets, and running the current set of DGAs with one or more current parameters to generate a plurality of domain names, and determining whether the domain is one of the generated plurality of domain names; and responsive to determining that the domain was generated by the DGA, accepting registration of the domain for the service and causing the proxy server to monitor communications received to and from the domain.

2. The method of claim 1, wherein causing the proxy server to monitor communications received to and from the domain includes causing the proxy server to receive traffic for the domain and to redirect the traffic for the domain to a computing device dedicated to monitor the traffic to and from the domain.

3. The method of claim 1, wherein causing the proxy server to monitor communications received to and from the domain is performed by storing an event log in a database for each message received at the proxy server to or from the domain.

4. The method of claim 1, wherein accepting registration of the domain for the service including the proxy server includes causing a Domain Name System (DNS) request for the domain to resolve to the proxy server instead of the command and control server resulting in all traffic directed to and originating from the command and control server to be routed through the proxy server.

5. The method of claim 1, wherein the current parameters includes at least one of a current time and a current date.

6. A service server comprising:

a non-transitory computer readable storage medium to store instructions; and a processor coupled with the non-transitory computer readable storage medium to process the stored instructions to:

receive, from a computing device, a request to register a domain for a service that includes a proxy server that is to receive and process traffic for that domain instead of the command and control server if registration is successful, upon receipt of the request to register the domain for the service and prior to accepting or denying the registration, determine that the domain was generated by a domain generation algorithm (DGA), wherein the determining includes:

retrieving a current set of DGAs from a database storing a list of DGAs known and used by botnets, and running the current set of DGAs with one or more current parameters to generate a plurality of domain names, and determining whether the domain is one of the generated plurality of domain names, and responsive to determining that the domain was generated by the DGA, to accept registration of the domain for the service and cause the proxy server to monitor communications received to and from the domain.

7. The service server of claim 6, wherein to and cause the proxy server to monitor communications received to and from the domain includes to cause the proxy server to receive traffic for the domain and to redirect the traffic for the domain to a computing device dedicated to monitor the traffic to and from the domain.

8. The service server of claim 6, wherein and cause the proxy server to monitor communications received to and from the domain is performed by storing an event log in a database for each message received at the proxy server to or from the domain.

9. The service server of claim 6, wherein to accept registration of the domain for the service including the proxy server includes causing a Domain Name System (DNS) request for the domain to resolve to the proxy server instead of the command and control server resulting in all traffic directed to and originating from the command and control server to be routed through the proxy server.

10. The service server of claim 6, wherein the current parameters includes at least one of a current time and a current date.

11. A non-transitory computer readable storage medium that provide instructions, which when executed by a processor of a service server, cause said processor to perform operations comprising:

receiving, from a computing device, a request to register a domain for a service that includes a proxy server that is to receive and process traffic for that domain instead of the command and control server if registration is successful;

upon receiving the request to register the domain for the service and prior to accepting or denying the registration, determining that the domain was generated by a domain generation algorithm (DGA), wherein the determining includes:

retrieving a current set of DGAs from a database storing a list of DGAs known and used by botnets, and running the current set of DGAs with one or more current parameters to generate a plurality of domain names, and determining whether the domain is one of the generated plurality of domain names, wherein the current parameters includes at least one of a current time and a current date; and responsive to determining that the domain was generated by the DGA, accepting registration of the domain for the service and causing the proxy server to monitor communications received to and from the domain.

12. The non-transitory computer readable storage medium of claim 11, wherein accepting registration of the domain for the service includes causing the proxy server to receive traffic for the domain and to redirect the traffic for the domain to a computing device dedicated to monitor the traffic to and from the domain.

13. The non-transitory computer readable storage medium of claim 11, wherein causing the proxy server to monitor communications received for the domain is performed by storing an event log in a database for each message received at the proxy server to or from the domain.

14. The non-transitory computer readable storage medium of claim 11, wherein accepting registration of the domain for the service including the proxy server includes causing a Domain Name System (DNS) request for the domain to resolve to the proxy server instead of the command and control server resulting in all traffic directed to and originating from the command and control server to be routed through the proxy server.

15. The non-transitory computer readable storage medium of claim 11, wherein the current parameters includes at least one of a current time and a current date.

* * * * *